Oct. 29, 1968    H. JENNY    3,407,897
DEVICE FOR RENDERING VISIBLE ACOUSTIC VIBRATIONS
Filed Jan. 24, 1967    5 Sheets-Sheet 1

INVENTOR
HANS JENNY

BY Wenderoth, Lind & Ponack
ATTORNEYs

Oct. 29, 1968 H. JENNY 3,407,897
DEVICE FOR RENDERING VISIBLE ACOUSTIC VIBRATIONS
Filed Jan. 24, 1967 5 Sheets-Sheet 3

INVENTOR
HANS JENNY

BY Wenderoth, Lind & Ponack
ATTORNEYS

Oct. 29, 1968 H. JENNY 3,407,897
DEVICE FOR RENDERING VISIBLE ACOUSTIC VIBRATIONS
Filed Jan. 24, 1967 5 Sheets-Sheet 4

INVENTOR
HANS JENNY

BY Wenderoth, Lind & Ponack

ATTORNEYS

Oct. 29, 1968   H. JENNY   3,407,897
DEVICE FOR RENDERING VISIBLE ACOUSTIC VIBRATIONS
Filed Jan. 24, 1967   5 Sheets-Sheet 5

INVENTOR
HANS JENNY

BY Wenderoth, Lind & Ponack

ATTORNEYS

United States Patent Office 3,407,897
Patented Oct. 29, 1968

3,407,897
DEVICE FOR RENDERING VISIBLE
ACOUSTIC VIBRATIONS
Hans Jenny, Ruttiweg 8, Dornach, Switzerland
Continuation-in-part of application Ser. No. 389,045,
Aug. 12, 1964. This application Jan. 24, 1967, Ser.
No. 611,356
Claims priority, application Switzerland, Aug. 14, 1963,
10,047/63
6 Claims. (Cl. 181—.5)

ABSTRACT OF THE DISCLOSURE

Acoustic phenomena are rendered visible by vibrating a membrane so as to produce configurations of a material on the membrane corresponding to acoustic sounds produced by the voice or a musical instrument.

---

This application is a continuation-in-part of my application Ser. No. 389,045 filed Aug. 12, 1964, entitled, "Entertainment and Exercise Unit" now abandoned.

The present invention relates to a device for rendering visible acoustic phenomena, in particular human vocal sounds.

Since Chladni towards the end of the 18th century had discovered the sound figures named after him and in 1802 had published his classical acoustics, acoustic vibrations have been made visible by various methods and in different media.

The following examples may be mentioned. Chladni's figures themselves were treated by the method of the frozen carbon dioxide by M. D. Waller in particular. They have also been displayed in outstanding manner with the aid of soap lamellae by Ludwig Bergmann. Above all, these phenomena may be followed especially well by crystals with piezo-electric effect through a wide frequency range. But also in polarized light there may be obtained oscillatory pictures with the aid of piezo-electric resonators high up in the ultrasound range, such as also have been obtained by Ludwig Bergmann. This comprises also a photoelastic visualization of oscillatory processes in connection with the stroboscopic effect such as has been reported by H. Wolf. In a certain sense, Kundt's dust figures belong to this field too, as also the visual representation of the interference by Zenneck with heterogeneous material, in which the nodal lines show a pendulous motion. Here also may be mentioned the sound-sensitive flames (Leconte, Tyndall, Zickendraht). These references suffice to characterize the domain coming into consideration here.

In all these processes and phenomena, acoustic oscillatory phenomena and oscillatory effects are documented visually also. In the present invention the human vocal sounds are rendered visible directly in their oscillatory picture in a simple and novel manner, in which above all the vowels are figurally and structurally characterized according to their complex frequencies spectrum with the formants thereof, naturally also in accordance with the sound pitch. The arrangement may be supplemented electroacoustically (loudspeaker, microphone). The tones and sounds of musical instruments also may be thus represented directly in an optical way and manner, and even music itself with the electro-acoustic supplement.

An object of the present invention essentially is to provide a construction comprising a hollow body having a top opening, a membrane stretchable on said hollow body covering said opening with means through which the air in said hollow body, and thereby said membrane, may be made to oscillate either by directly being blown at, sung at or talked to, or in an electro-acoustic way and manner.

A further object is to provide means whereby the oscillations are rendered visible by energizing a material applied to the membrane and capable of flowing so as to vibrate to produce on the membrane oscillatory configurations corresponding to the vibrations thereof.

In this connection a flowable material comprises all and any substances which through oscillations may be energized to form corresponding configurations and, respectively, to undergo corresponding movements. Especially suited inter alia are lycopodium powder, quartz sand, and water. Fundamentally, however, all and any fine-grained substances of different grain sizes, as well as all the liquids of the most dissimilar viscosities may be used, inclusive of viscous, mushy or pulpy pastes. Also smoke as well as colored gases and vapours enter into question.

A main object of the invention, therefore, is to make visible the above materials in configurations corresponding to sound vibrations.

The present invention differs fundamentally from all wind instruments for the production of sounds. Contrary to these instruments, for instance the so-called "Kazoos," the subject matter of the present invention is not concerned with the production of a sound, but the tone or sound has to be available already at the inlet of the device and is therefore the first impulse from which everything else originates. In the present invention there is no blowing in, as in a wind instrument, but is sung at or spoken at. The purpose is not the production of a sound, but the transformation of the same into an image optically visible by the eye.

It is furthermore known that irregularities on the surfaces of structural panels can be determined by the use of sound waves. The structural panels are strewn for this purpose with a finely granulated material and are subjected to the effect of one or several loud speakers, whereby the finely granulated material is caused to vibrate and displays by its dislocation the position of the undesirable elevations or depressions in the structural panels. Such an application could never be used for making a sound or tone visible.

A further object of the invention is to provide means for tensioning a membrane and known embodiments of the above kind do not provide possibilities for tensioning a membrane since the membrane in such devices must consist of a rigid material and besides must be provided with an uneven surface and therefore such control apparatus can be used only on the principle of a resonance, which according to the present invention is not the case.

A further object of the present invention is to provide a tensible, elastical membrane, the surface of which has to be completely even and horizontal. If one uses the mentioned control devices together with even smooth panels which are not tensible and can be only placed on, then one obtains under the influence of sound waves only an irregular confusion of the fine granular material corpuscles.

A further object is to bring about the same shape in characteristic forms on the membrane which in their special kind is an optical expression of acoustic phenomena heretofore completely unknown. The characteristic of expression as the basis of the tones and sounds is thereby according to the present invention brought into the world of the visible.

With the above and other objects in view which will become apparent from the detailed description below, two preferred modifications are shown in the drawings in which.

Figure 1:
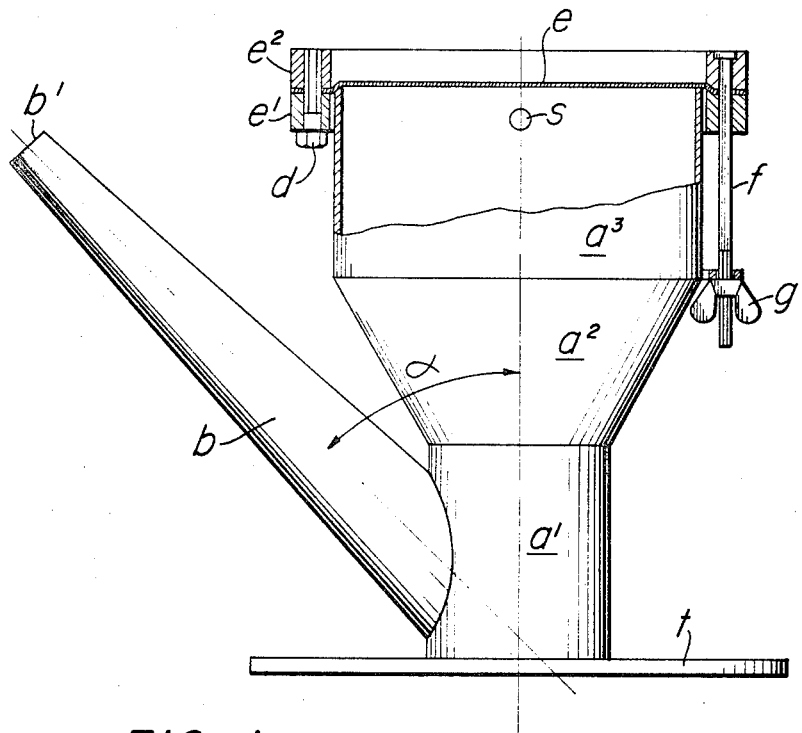
FIGURE 1 is a side view, partly in section, of a first form of a device for rendering visible acoustic phenomena in the shape of a smoker's pipe.

The first form of the unit (FIGURES 1 and 2) is shaped like a pipe and includes a vessel of which the upper end is open and which forms the pipe head. Said vessel comprises three superadjacent parts $a^1$, $a^2$ and $a^3$ of circular cross-section, of which the top part $a^3$ is cylindrical and has a greater diameter than the bottom part $a^1$ that also is cylindrical. The center part $a^2$ is funnel shaped and forms the transition between the two cylindrical parts $a^1$ and $a^3$.

To the bottom part $a^1$ is attached a blow pipe $b$ which forms the "pipe stem" and on which may be mounted, if desired, a hose including a mouthpiece. The part $a^3$ is covered on top by a membrane $e$ which for example may be made of rubber, metal foil, paper foil, animal skin or plastic and the rim of which is clamped between two annular parts $e^1$ and $e^2$ that are secured to each other by means of screws $d$ and together form a clamping frame. The membrane $e$ itself lies on the top rim of the part $a^3$ which by means of tightening screws $f$ is connected to the frame $e^1$, $e^2$. By tightening wing nuts $g$ provided on the bottom end of the screws $f$, the membrane may be stretched as desired.

When it is desired to use the device for rendering visible acoustic phenomena a certain quantity of a flowable material is put on the membrane $e$ which is then made to vibrate for the purpose of producing thereon continually varying oscillatory formations caused by sounds of different pitch. Depending on the membrane tension adjusted by tightening the wing nuts $g$, the choice of materials, the blowing force, the selected pitch and the timbre of the sounds of the human voice or of the musical instruments or other sound sources used, the vibrating particles present on the membrane will assume the most varied configurations.

The device functions satisfactorily when the sound vibrations occurring in container $a^1$, $a^2$, $a^3$ have a turbulence. A turbulence is an essential prerequisite in any wind instrument for the formation of sound and is, for instance, obtained in a trumpet by the known narrowing of the mouthpiece. In the present invention, the turbulence is obtained by the deviation of the sound vibration during the transfer from pipe $b$ to the container part $a^1$, whereby the angle $\alpha$ between the pipe axis and the main axis of the container $a^1$, $a^2$, $a^3$ plays an important part. It has been found that the best results will be obtained with an angle $\alpha$ of about 45°. But also other angles, deviating from this value usually display satisfactory results.

An important part is also the provision of an opening S in the container wall. This opening serves for the pressure compensation and provides an immediate escape for the accumulating air in the container caused by speaking or singing into the same, so that a buckling of the flexible membrane $e$ and thereby an undesired shift of the flowable material present on the same is avoided. The opening S which is arranged in FIG. 1 on the cylindrical container part $a^3$ could also be provided on the parts $a^2$ or $a^1$.

The entire device rests preferably on a base $t$ so that the membrane $e$ maintains its horizontal position during the singing or speaking.

Figure 2:
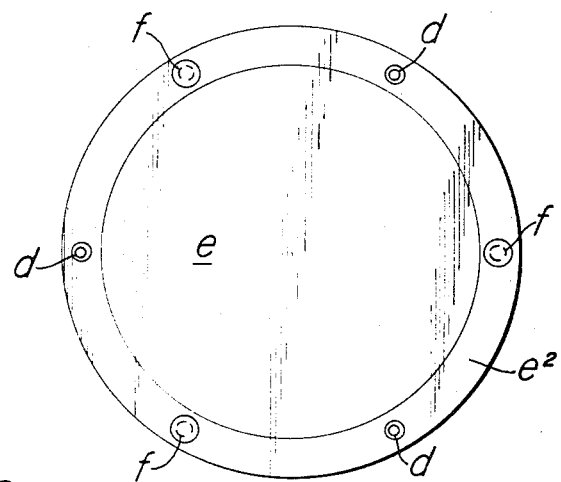
FIGURE 2 shows a top plan view thereof.

For the visualization of an acoustic phenomenon, for instance of a vocal, the membrane $e$ of the device illustrated in FIG. 1 is tensioned by means of wing bolts $g$ and is strewn with a flowable material for instance finely granulated sand. If now immediately before the opening $b'$ of the mouthpiece $b$ a vocal is spoken, the produced sound oscillations transmit through the mouthpiece $b$ into the interior of the container where they deviate during the transfer from pipe $b$ to the container part $a^1$ with the formation of turbulences. The turbulence effect is absolutely necessary since otherwise the air column in container parts $a^1$, $a^2$, $a^3$ is not sensible.

On account of this absolutely necessary turbulence the vibrating air column in the interior of the container $a^1$, $a^2$, $a^3$ vibrates the membrane so that the corpuscles on the membrane form a sound pattern which is characteristic for the spoken vocal. This sound pattern will be always the same for the same vocal at the same height of sound and strength of voice. A different vocal will produce a completely different pattern corresponding to the frequency spectrum. The same is applicable as well for consonants and sounds produced by musical instruments which according to the pitch of the sounds and the tone depending on the instrument produce varied and manifold patterns.

This exact objective correlation between the acoustic phenomenon and its optical counterpart (the sound pattern) has many practical applications, as for instance, in the medical field creating completely new perspectives. Deaf people, as is known, articulate their sounds of speech badly and indistinctly because they do not have any possibility to control the spoken word. While a person having normal hearing and power of sight constantly hears his own words and corrects by his hearing, a deaf person has no ear available for correcting, but indirectly only by the sense of sight and touch. It is evidently better to transform the perceptibility to the higher sense, namely sight, than to the sense of touch. If such a deaf person speaks into the "tonoscope" then on membrane $e$ a vibration pattern is formed which the speaking person can compare and correct with a copy. During the medial practice of the inventor it proved successful for instance when physician and patient (deaf) worked together with the device, the mouthpiece $b$ of which was provided with two flexible hoses extending into the mouthpiece $b'$. In this way physician and patient can speak alternatingly and the patient can control his acoustic sounds constantly with his eyes and can correct the same.

Figure 3:
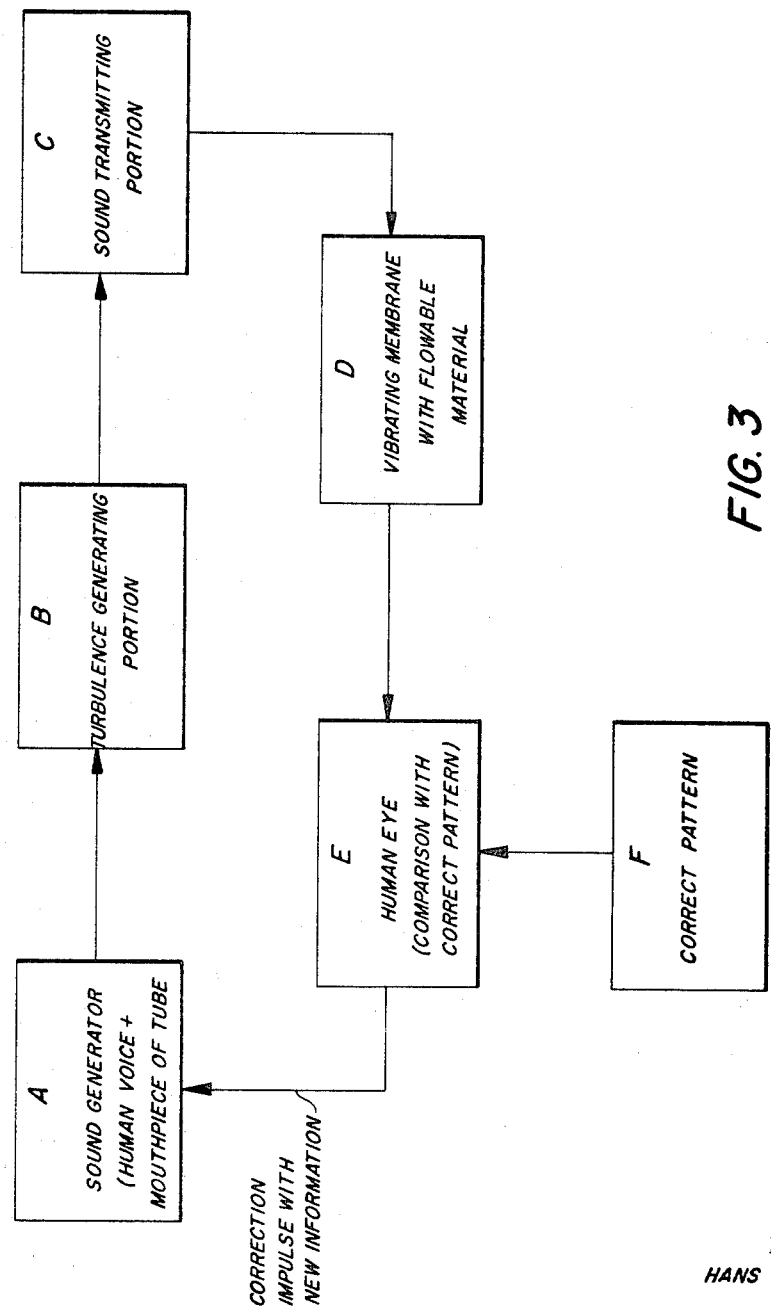
FIGURE 3 is a diagrammatic representation illustrating how the device may be used with deaf persons to improve their speech.

In analogy the closed self-controlling regulating systems of the Kybernik should be considered a closed regulating circle in itself, as illustrated in FIG. 3. The generator A in which the sound is produced and which consists in the case at hand of the speaking organ of the speaking person and the mouthpiece of the pipe $b$. From here the sound impulses in the form of sound waves is transmitted via a turbulence producing part B (deviation, angle position of pipe) to the sound transmitting part C, e.g. to the air column present below the membrane $e$ in the container $a^1$, $a^2$, $a^3$ and transmits to the same the vibrations corresponding to the character of the sound. By this vibration the membrane D and thereby the parts lying on the same are likewise caused to vibrate and here the transformation of the sound phenomenon takes place into an optical, e.g. a phenomenon being visible by the eye. The membrane itself therefore is the place of the coincidence of acoustical and optical phenomena, while the sound pattern itself may be considered a visualizable phonetical element.

The impulse, followed further, according to FIGURE 3 meets in the form of light rays the human eye E to which from another side a comparative value from a pattern F is conveyed. According to the comparison taking place in the consciousness of the speaking person and the determination of the difference the corresponding command for the correction to the speaking organ A is given and the regulation circle is closed. There is, therefore, in the kybernetic circle an acoustical shank and a visualizable shank which form an indivisible unit.

Figure 4:
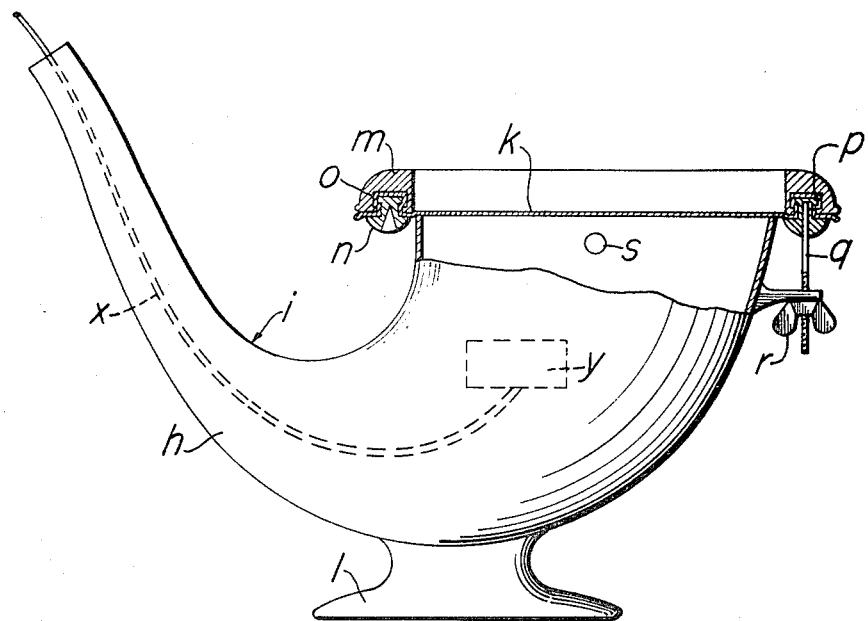
FIGURE 4 is a side view of a second form.
Figure 5:
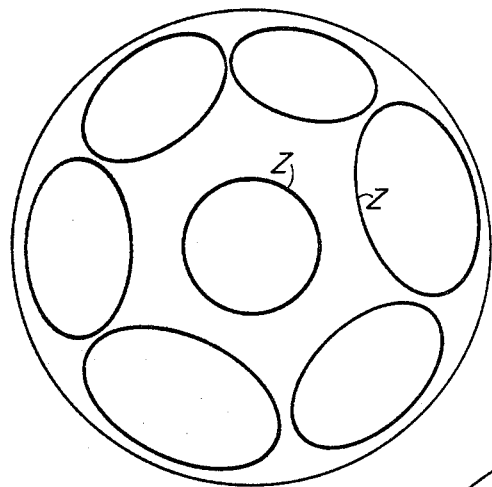
FIGURES 5 to 10 illustrate examples of sound figures obtained with the unit shown in FIGURES 1 and 2.
Figure 6:
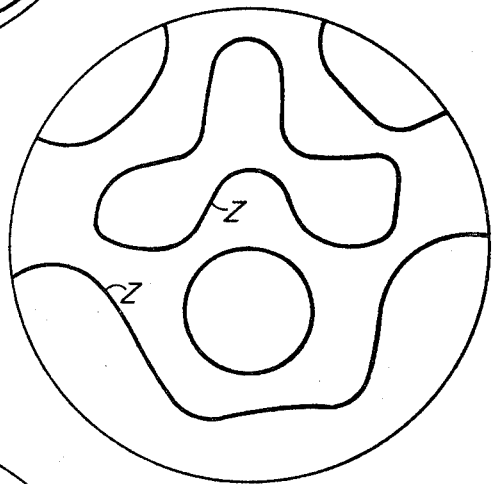
Figure 7:
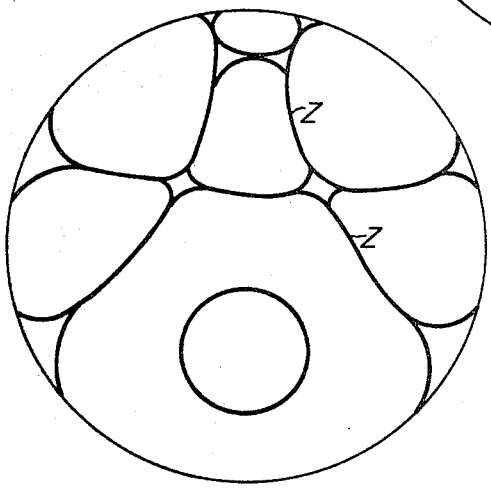
Figure 8:
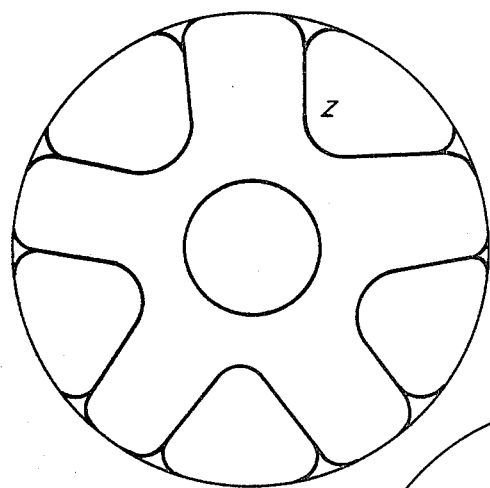
Figure 9:
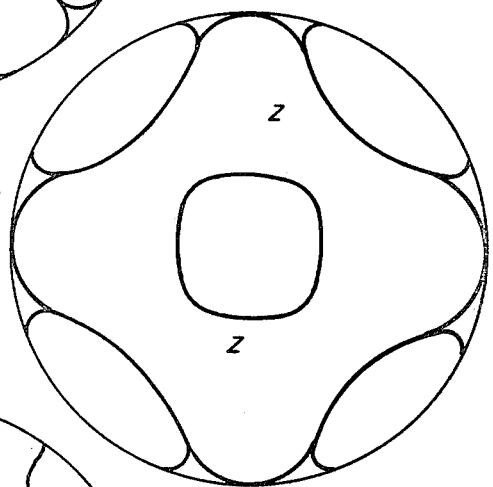
Figure 10:
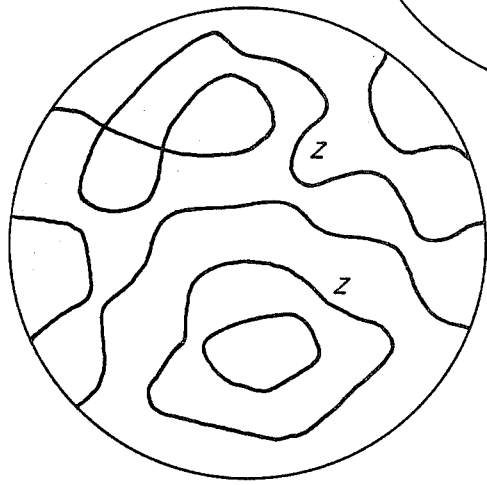

A second form of the invention is shown in FIGURE 4 and comprises a hollow body $i$ of which the top opening is covered by a membrane $k$. The blow tube, however, forms with the hollow body $i$ and a base $l$ that also is hollow and serves as support, an integral member made of plastic for example, so that the unit substantially assumes the shape of a horn.

For reasons that will be more fully explained below, it is desirable that the membrane $k$ stretched over the hollow body $i$ be quickly and readily replaceable. To such end, the clamping frame shown in FIGURE 4 was developed for stretching the membrane. Said frame here also comprises an upper annular part $m$ made for example of polyethylene, and a lower annular part $n$ made for example of polystyrene, between which the membrane $k$ is framed. The upper annular part $m$ comprises on its underside a groove $o$ that extends over its entire periphery and is of substantially dovetail cross-section, while the lower annular part $n$ on its topside has a bead $p$ which in cross-section is adapted to said groove $o$. Owing to its elasticity, the lower annular part $n$ with bead $p$ may be pressed into the groove $o$ of the upper part $m$ like a press-button until the dovetail-like enlargement of bead $p$ snaps into the corresponding recess of groove $o$. The two annular parts $m$ and $n$ are separated simply by withdrawing the bead $p$ from groove $o$. In this form of clamping frame the membrane also does not have to be perforated for the purpose of passing fastening screws therethrough.

For stretching the membrane, here also tightening screws $q$ are used of which one end is embodied in the lower annular frame $n$ and which may be tightened by means of wing nuts $r$.

The unit further may be formed to serve for the optical reproduction of sound vibrations supplied thereto in an electro-acoustical way and manner. To such end, a cable X is introduced into the hollow body either through the blow pipe or through a small aperture, and in the hollow body and below the membrane is disposed a small loudspeaker Y that is connected to a radio receiver or a microphone disposed outside the unit. The membrane of the unit disclosed then is excited to vibrate by the acoustic vibrations emitted from the loudspeaker Y.

FIGURES 5 to 10 show some examples from the great multitude of sound figures obtainable. In this case, by using quartz sand Z and the unit shown in FIGURE 1, are rendered visible various sounds of the human voice with respectively characteristic frequency spectra. The black lines represent the figures formed by the quartz sand on the vibrating membrane.

From the multitude of applications and uses of the unit disclosed herein only a few examples shall be singled out.

The unit, in addition to its serious uses set forth above, may be used as a toy for children and for the entertainment of adults. The combination of sound and visible configuration which simultaneously captivates eye and ear, is the best presumption for entertaining play which also can be instructive. When using colored materials such as colored sand, and fixing the figures produced by spray-coating with a subsequently congealing liquid, a fixed picture characteristic for the emitted sound is obtained on the membrane. For such purposes, the clamping frame shown in FIGURE 4 is especially suited, which permits to simply and readily replace the membrane.

The unit provided with a small built-in loudspeaker may be used for various purposes. When douching the membrane with a liquid such as water and connecting the loudspeaker to a radio receiver, one may hear for example a musical presentation and visually follow the corresponding sound figures, for example by projecting onto a ceiling the figures visible on the water surface and continually varying with the music.

I claim:

1. A device for rendering visible acoustic vibrations, comprising a hollow body having a wall provided with a top opening, means generating sound waves for vibrating the air contained in said body with a turbulence effect, said means generating sound waves including a tube communicating with the interior of said hollow body having an axis forming an acute angle with the main axis of said hollow body, said wall having a hole therein for pressure compensation, a relatively large horizontally disposed membrane of elastic material covering said opening having its outer surface even and its central portion free to oscillate in response to air turbulence within said hollow body, means for adjusting the tension of said membrane, and a flowable visible material lying on said membrane, whereby said sound vibrations are transferred by said membrane to said flowable material to form an optical expression in a characteristics pattern by said flowable material for said sound waves.

2. A device as set forth in claim 1 wherein said hollow body has the form of a smoker's pipe having a head comprising three superadjacent parts, the central part being funnel-shaped and the other two parts being cylindrical, said central part interconnecting said other two parts, and said tube being connected to the lower cylindrical part.

3. A device as set forth in claim 1 wherein said hollow body is shaped like a horn and is integral with said tube.

4. A device as set forth in claim 1, wherein said means for adjusting the tension comprises a clamping frame secured to the periphery of said membrane and tightening screws connected to said hollow body and said frame so that the tension of said membrane may be increased by tightening said screws.

5. A device as set forth in claim 4, in which said clamping frame comprises two annular parts that are screwed together to grip said membrane disposed between them.

6. A device as set forth in claim 4, in which said clamping frame comprises two annular members of which at least one is made of elastic material, and one of said members has a recess and the other a bead corresponding to such recess so that said two members may grip said membrane disposed between said members by forcing said bead into said recess.

References Cited

UNITED STATES PATENTS

| | | | |
|---|---|---|---|
| 700,986 | 5/1902 | Smith | 46—182 |
| 1,759,953 | 5/1930 | Myers | 46—182 |
| 2,700,316 | 1/1955 | Gordon et al. | 84—330 |
| 2,782,632 | 2/1957 | Klein et al. | 181—.5 |
| 3,029,679 | 4/1962 | La Londe | 84—411 |
| 1,751,490 | 3/1930 | Myers | 46—182 |

BENJAMIN A. BORCHELT, *Primary Examiner.*

G. H. GLANZMAN, *Assistant Examiner.*